(12) United States Patent
Johnson

(10) Patent No.: US 6,489,049 B1
(45) Date of Patent: Dec. 3, 2002

(54) ELECTROCHEMICAL CONVERSION SYSTEM

(75) Inventor: Lonnie G. Johnson, Atlanta, GA (US)

(73) Assignee: Johnson Electro Mechanical Systems, LLC, Smyrna, GA (US)

( * ) Notice: Subject to any disclaimer, the term of this patent is extended or adjusted under 35 U.S.C. 154(b) by 15 days.

(21) Appl. No.: 09/609,675

(22) Filed: Jul. 3, 2000

(51) Int. Cl.[7] .................................................. H01M 8/04
(52) U.S. Cl. .............................. 429/13; 429/17; 429/20
(58) Field of Search ............................... 429/12, 13, 17, 429/19, 20, 30, 11

(56) References Cited

U.S. PATENT DOCUMENTS

| | | | |
|---|---|---|---|
| 4,040,410 A | 8/1977 | Libowitz | 126/270 |
| 4,049,877 A | 9/1977 | Saillant et al. | 429/11 |
| 4,098,958 A | 7/1978 | Bettman | 429/17 |
| 4,422,500 A | 12/1983 | Nishizaki et al. | 165/104.12 |
| 4,505,991 A * | 3/1985 | Weber | 429/11 |
| 4,523,635 A | 6/1985 | Nishizaki et al. | 165/104.12 |
| 4,677,038 A | 6/1987 | Salomon | 429/11 |
| 4,692,390 A | 9/1987 | Roy et al. | 429/17 |
| 4,781,029 A | 11/1988 | SerVaas | 60/641.7 |
| 4,795,683 A * | 1/1989 | McElroy | 429/13 |
| 4,818,638 A | 4/1989 | Roy et al. | 429/20 |
| 4,868,072 A * | 9/1989 | Abbin et al. | 429/11 |
| 4,871,626 A * | 10/1989 | Williams | 429/11 |
| 5,139,895 A | 8/1992 | Roy et al. | 429/17 |
| 5,492,570 A * | 2/1996 | Horner-Richardson et al. | 136/200 |
| 5,928,436 A | 7/1999 | Borkowski et al. | 136/205 |

FOREIGN PATENT DOCUMENTS

| | | |
|---|---|---|
| EP | 0 055 855 A2 | 7/1982 |
| EP | 0 071 271 A2 | 2/1983 |
| EP | 0 168 062 A2 | 1/1986 |

* cited by examiner

*Primary Examiner*—Stephen Kalafut
*Assistant Examiner*—M. Wills
(74) *Attorney, Agent, or Firm*—Baker, Donelson, Bearman & Caldwell

(57) ABSTRACT

An electrochemical conversion system 10 is disclosed having a housing (11) which includes boiling chamber (12), a cell holding block (13), and a condensing chamber (14) coupled by conduits. The system also includes an electrochemical cell (23) mounted within the cell holding block, a heater (24) mounted in thermal communication with the boiling chamber, and a cooler (25). With the energization of the heater a portion of the working fluid is heated to a vapor state so as to create a high total pressure with a low partial pressure of hydrogen gas upon one side of the electrochemical cell, while simultaneously a high partial pressure of hydrogen gas is developed on the opposite side of the cell. The hydrogen partial pressure differential across the cell causes an electrical potential across the cell as hydrogen migrates across the cell.

19 Claims, 2 Drawing Sheets

ELECTROCHEMICAL CONVERSION SYSTEM

TECHNICAL FIELD

This invention relates to the conversion of heat energy to electrical energy utilizing an electrochemical cell.

BACKGROUND OF THE INVENTION

The conversion of chemical energy to electrical energy may be accomplished in a variety of ways. It is known that electrochemical cells or batteries rely on redox reactions wherein electrons from a reactant being oxidized are transferred to a reactant being reduced. With the separation of the reactants from each other, it is possible to cause the electrons to flow through an external circuit where they can be used to perform work.

Electrochemical cells however have had a problem of exhausting the reactants. Although most cells can be recharged by applying a reverse polarity voltage across the electrodes, such recharging requires a separate electrical source. During the recharging of the cell the cell typically is not utilized as an electrical power source, thus rendering it unusable during the recharging period.

Fuel cells have been developed in an effort to overcome problems associated with electrochemical cells. Typically, fuel cells operate by passing an ionized species across a selective electrolyte which blocks the passage of the non-ionized species. By placing porous electrodes on either side of the electrolyte, a current may be induced in an external circuit connecting the electrodes. The most common type of fuel cell is a hydrogen-oxygen fuel cell which passes hydrogen through one of the electrodes while oxygen is passed through the other electrode. The hydrogen and oxygen combine at the electrolyte-electrode interface to produce water. By continuously removing the water, a concentration gradient is maintained to induce the flow of hydrogen and oxygen to the cell.

These types of fuel cells however suffer from a number of disadvantages. These cells must be continuously supplied with a reactant in order to continuously produce electricity. Additionally, these cells produce a continuous product stream which continuously must be removed, the removal of which may pose a problem. The porous electrodes of these fuel cells must allow the passage of the reactant entering the cell. However, over time these porous electrodes can become fouled or plugged so as to slow or even prevent the passage of the reactant. Such slowing of the reactant flow reduces the production of electricity. Lastly, the selection of an appropriate electrolyte is not always easy. The electrolyte must rapidly transport the ionized species in order to increase the current production. Frequently, the limited migration of the ionized species through the electrolyte is a limiting factor on the amount of current produced.

In an effort to avoid the problems inherent with the previously described fuel cells, thermoelectric conversion cells have been designed. These thermoelectric conversion cells utilize heat to produce a pressure gradient to induce the flow of a reactant, such as molten sodium, across a solid electrolyte. A current is generated as sodium atoms lose electrons upon entering the electrolyte and gain electrons upon leaving the electrolyte. These cells however also suffer from the plugging of the porous electrodes required to pass the sodium ions. Furthermore, the diffusion of the sodium ions through the solid electrolytes has proven to be slow, thereby limiting the amount of current produced by the cell. Lastly, these types of fuel cells operate at extremely high temperatures, typically in a range between 1,200–1,500 degrees Kelvin, thus making them impractical for many uses.

Accordingly, it is seen that a need remains for an electrochemical conversion system that does not require a continuous source of reactant, which does not require an electrolyte which may be plugged over time and which may be operated at relatively low temperatures. It is the provision of such therefore that the present invention is primarily directed.

SUMMARY OF THE INVENTION

In a preferred form of the invention an electrochemical conversion system comprises an electrochemical cell, a housing which in combination with the electrochemical cell defines a first pathway which directs a two phase fluid stream past the electrochemical cell, and a two phase fluid stream contained within the housing. The system also has heating means thermally coupled to the housing for heating the fluid stream to a vapor phase prior to the electrochemical cell, cooling means thermally coupled to the housing for cooling the fluid stream to a liquid phase subsequent to the electrochemical cell, and a stream of hydrogen gas in fluid communication with the electrochemical cell. With this construction, the heating means vaporizes the two phase fluid stream so as to cause a low partial pressure of hydrogen upon one side of the electrochemical cell and therefore a pressure differential of hydrogen across the electrochemical cell which in turn causes the hydrogen gas to pass through the electrochemical cell creating an electric potential difference, the hydrogen is then entrained into the vaporized fluid stream.

DETAILED DESCRIPTION

Figure 1:
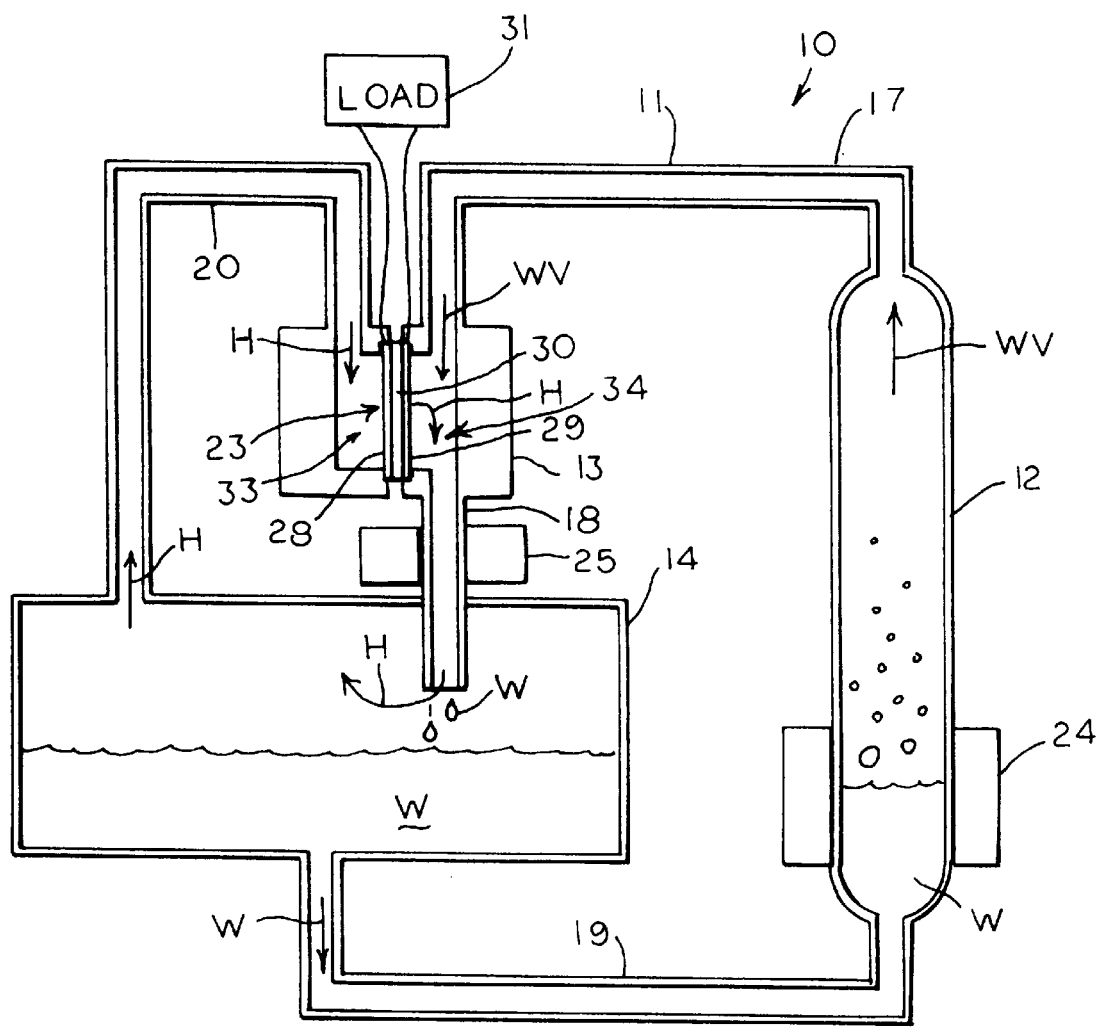
FIG. 1 is a schematic view of an electrochemical conversion system in a preferred form of the invention.

With reference next to the drawings, there is shown in FIG. 1 an electrochemical conversion system 10 in a preferred form of the invention. The system 10 has a housing 11, made of a non-reactive material such as stainless steel, which includes a boiling chamber 12, a cell holding block 13, and a condensing chamber 14. The housing 11 also includes a first conduit 17 extending between the boiling chamber 12 and the cell holding block 13, a second conduit 18 extending between the cell holding block 13 and the condensing chamber 14, a third conduit 19 extending between the condensing chamber 14 and the boiling chamber 12, and a fourth conduit 20 extending between the condensing chamber 14 and the cell holding block 13.

The system 10 also includes an electrochemical cell 23 mounted within the cell holding block 13, a heater 24 mounted in thermal communication with the boiling chamber 12, and a cooler 25 mounted in thermal communication with the second conduit 18.

The electrochemical cell 23 has a first gas diffusion electrode 28, a second gas diffusion electrode 29 and a proton conductive membrane 30, such as Nafion made by E.I. du Pont de Nemours, mounted between the first and second gas diffusion electrodes 28 and 29. This type of electrochemical cell is available from E-Tek, Inc. of Somerset, N.J. The electrochemical cell electrodes 28 and 29 are electrically coupled to an external load or circuit 31.

The cell holding block 13 has a first chamber 33 in fluid communication with the fourth conduit 20 and the front surface of the electrochemical cell 23 including the first gas diffusion electrode 28. The cell holding block 13 also includes a second chamber 34 in fluid communication with the first conduit 17, the second conduit 18 and the rear surface of the electrochemical cell 23 including the second gas diffusion electrode 34. The first and second chambers 33 and 34 may also be termed first and second pathways, which are separated from each other by the electrochemical cell.

In use, a portion of the condensing chamber 14, the third conduit 19 and a portion of the boiling chamber 12 are filled with a working fluid F, such as water, in liquid phase. The remaining portion of the condensing chamber 14, the remainder of boiling chamber 12, the fourth conduit 20, the cell holding block 13 and the second conduit 18 contain hydrogen gas H. With the energization of the heater 24 a portion of the two phase fluid, referred hereinafter as water, is heated to a vapor state, depicted as WV. The water vapor WV fills the remainder of the boiling chamber 21, forcing hydrogen out and thereby reducing the hydrogen partial pressure to a low value. The water vapor WV passes from the boiling chamber 12, through the first conduit 17 and into the cell holding block second chamber 34. The high pressure created by the vaporization of the water creates a low partial pressure of hydrogen gas H within the second chamber 34. This low partial pressure of hydrogen gas H is less than the partial pressure of the hydrogen gas within the first chamber 33 of the cell holding block 13.

As the hydrogen pressure differential between the first and second chambers 33 and 34 increases an electrical potential across the cell is created and progressively increased. Hydrogen gas at the higher pressure first, chamber adjacent the first electrode 28 is oxidized into protons. These protons are conducted through the proton conductive membrane 30 to the second electrode 29 at the lower pressure second chamber. At the-second electrode 29 the hydrogen protons are reduced into hydrogen gas. The oxidation of the hydrogen gas causes the release of electrons which are then passed to the first electrode while the reduction of protons into hydrogen gas causes the acceptance or receiving of electrons from the second electrode, thereby inducing an electric current through load 31.

Once the hydrogen passes through the electrochemical cell it is entrained into the stream of water vapor WV passing through the second chamber 34. The mixture of water vapor WV and hydrogen gas H passes through the second conduit 18 wherein the cooler 25 reduces the temperature of the mixture so as to cause the majority of water vapor WV to condense back into a liquid phase W. Water W, hydrogen gas H and possibly a small amount of water vapor WV exits the second conduit 18 into the condensing chamber 14. As the water condenses the hydrogen gas H is separated from the liquid water W. The liquid water W is then passed through the third conduit 19 back to the boiling chamber 12 so as to be revaporized and cycled or circulated through the system again.

As the separated hydrogen gas H exits the second conduit 18 the hydrogen gas occupies the top portion of the condensing chamber while the liquid water W occupies the lower portion of the condensing chamber. The hydrogen gas H then circulated through the fourth conduit 20 and back into the first chamber 33 of the cell holding block 13 as the pressure within the condensing chamber increases. This hydrogen gas is then once again passed through the electrochemical cell 23 so as to continuously generate electricity.

Figure 2:
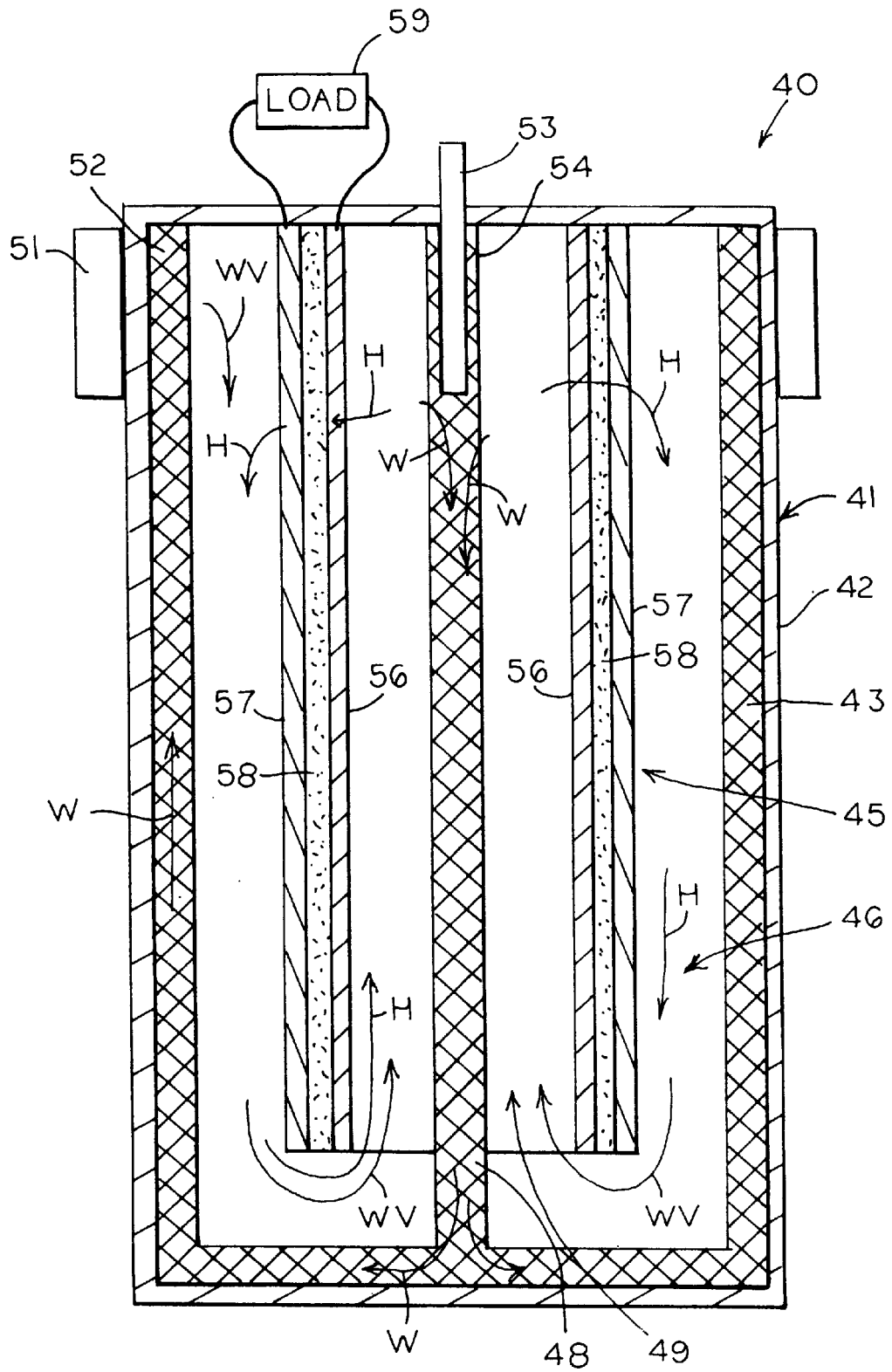
FIG. 2 is a schematic view of an electrochemical conversion system in another preferred form of the invention.

With reference next to FIG. 2, there is shown an electrochemical conversion system 40 in another preferred form of the invention. Here, the housing 41 is tubular with both ends closed. The housing 41 has an external shell 42 and an internal liner 43 made of a conventional liquid wicking material the selection of which is predicated upon the selection of the two phase fluid. The system 40 also has a tubular electrochemical cell 45 mounted concentrically within the tubular housing 41 and spaced from the internal liner 43 so as to create a first chamber or pathway 46 therebetween. The liner 43 has a central portion 48 which extends concentrically within and spaced from the tubular electrochemical cell 45 so as to define a second chamber or pathway 49 therebetween extending continuously from the first pathway 46. The system also includes a heater 51 in thermal communication with one end 52 of the liner 43 and a cooler 53 in thermal communication with an opposite end 54 of the liner 43.

The electrochemical cell 45 has a tubular first gas diffusion electrode 56, a tubular second gas diffusion electrode 57 and a tubular proton conductive membrane 58, such as Nafion made by E.I. du Pont de Nemours, mounted between the first and second gas diffusion electrodes 56 and 57. The electrochemical cell electrodes 56 and 57 are electrically coupled to an external load or circuit 59.

In use, the housing 41 is filled with a working fluid W, such as water, and a supply of hydrogen gas H. With the energization of the heater 51 a portion of the working fluid W, again referred hereinafter as water, within the wicking liner 43 adjacent the heater 51 is heated to a vapor state, depicted as WV. The water vapor WV passes from the wicking liner 43 while simultaneously the cooler 53 causes water vapor WV within the housing adjacent the cooler to condense upon the wicking liner 43 adjacent the cooler. This continuous evaporation and condensing of the water causes a continuous stream of water vapor WV to pass from adjacent the heater 51, through the first pathway 46, into and through the second pathway 49 to a condensation area upon the wicking liner 43 adjacent the cooler 53. Simultaneously, the water vapor WV is continuously condensed and collected upon the wicking liner 43 adjacent the cooler 53 and the liquid water W continuously passed through the wicking liner back to a position adjacent the heater 51. This continuous evaporation and condensation of water is similar to a conventionally known heat pipe. Again, the high pressure created by the vaporization of the water creates a low partial pressure of hydrogen within the first pathway 46 while the condensation of the water vapor creates a high partial pressure of hydrogen within the second pathway 49.

The resulting hydrogen pressure differential between the first and second pathways 46 and 49 produces an electrical potential across the electrochemical cell. Hydrogen gas at the higher pressure first pathway 46 adjacent the first electrode 56 is oxidized into protons. These protons are conducted through the proton conductive membrane 58 to the second electrode 57 at the lower pressure second pathway 49. At the second electrode 57 the hydrogen protons are reduced into hydrogen gas. The oxidation of the hydrogen gas causes the release of electrons which are then passed to the first electrode 56 while the reduction of protons into hydrogen gas causes the acceptance or receiving of electrons from the second electrode 57, thereby inducing a current flow through load 59.

Once the hydrogen passes through the electrochemical cell 45 it is entrained into the stream of water vapor WV passing through the first pathway 46 and into second pathway 49. As the water condenses the hydrogen gas H is separated from the liquid water W thereby once again increasing the partial pressure of the hydrogen within the second pathway adjacent the area of condensation. The liquid water W is then passed through the wicking liner 43 back to a position adjacent the heater 51 so as to be revaporized and cycled or circulated through the system again.

It should be understood that the position of the heater and cooler may be reversed, thereby causing the flows of the water vapor and liquid water to be reversed. The system may be operated at relatively low temperatures differences, for example with the system utilizing water the temperature would be approximately 100 degrees Celsius. As such, this system is both safe and manageable. Furthermore, this system converts energy without any mechanically moving parts, and as such is practically free of mechanical failure.

It should be understood that the previously described systems may utilize any form of heat source such as electric heaters, gas burning heaters, heated air, radiation heat sources, radiant heaters or other conventionally known means of producing heat. The system may also utilize any form of cooling means such as cooling water jackets, heat sinks, refrigerators, cooling radiators, heat dissipaters or another other conventionally known means of removing heat. It should be understood that other two phase working fluids may be utilized as a substitute for the water shown in the preferred embodiments. Also, the system may be utilized with other ionizable gases in conjunction with material which allows the passage of the ionized gas, such gases include, but are not limited to oxygen and sodium.

Lastly, it should be understood that by controlling the passage of the electrical current one may control the flow of the hydrogen across the electrochemical cell. As such, the rate of heat removed from the high temperature side can be controlled precisely based on the hydrogen flow rate. Consequently, the temperature at the heat source side can be controlled. Thus, the devices disclosed herein are thermodynamically reversible in that an electric current can be induces in the electrochemical cell in order to pump hydrogen from one side of the electrochemical cell to the other and thereby create a low partial pressure for water vapor. The resulting low partial pressure for water vapor results in vaporization of water and thereby a refrigeration effect.

It thus is seen that an electrochemical conversion system is now provided which is efficient and which may be operated over relatively low temperature differences. It should of course be understood that many modifications, in addition to those specifically recited herein, may be made to the specific embodiments described herein without departure from the spirit and scope of the invention as set forth in the following claims.

What is claimed is:

1. An electrochemical conversion system comprising:
   an ion conductive material;
   a first electrode mounted upon one side of said ion conductive material;
   a second electrode mounted upon one side of said ion conductive material opposite said first electrode;
   a housing containing a working fluid stream, said housing in combination with said electrochemical cell defining a first pathway which directs the working fluid stream past said first electrode;
   heating means thermally coupled to said housing for heating said fluid stream to a vapor phase prior to passing past said second electrode;
   cooling means thermally coupled to said housing for cooling said fluid stream to a liquid phase subsequent to passing past said electrochemical cell; and
   a stream of ionizable gas in fluid communication with said second electrode,
   whereby the heating means vaporizes the working fluid stream so as to cause a low partial pressure of ionizable gas adjacent the second electrode and therefore a pressure differential of ionizable gas across the ion conductive material which in turn causes the ionizable gas to pass through the ion conductive material creating an electric potential difference, the ionizable gas is then entrained into the vaporized working fluid stream.

2. The electrochemical conversion system of claim 1 wherein said stream of ionizable gas is circulated through said ion conductive material.

3. The electrochemical conversion system of claim 2 wherein said housing defines a second pathway through which said stream of ionizable gas is passed.

4. The electrochemical conversion system of claim 1 wherein said housing first pathway includes a boiling chamber thermally coupled to said heating means and a condensing chamber thermally coupled to said cooling means.

5. The electrochemical conversion system of claim 4 wherein said housing defines a second pathway through which said stream of ionizable gas is passed, and wherein said second pathway converges with said first pathway at least through said condensing chamber, whereby the condensing of the working fluid separates the ionizable gas from the working fluid.

6. The electrochemical conversion system of claim 1 wherein said ion conductive material is a proton conductive membrane.

7. The electrochemical conversion system of claim 1 wherein said housing includes an elongated conduit having an external shell, wicking means for transporting said working fluid stream in liquid phase from a position adjacent said cooling means to a position adjacent said heating means.

8. The electrochemical conversion system of claim 7 wherein said housing is tubular, wherein said first electrode, said second electrode and said ion conductive material are substantially tubular and are mounted concentrically within said tubular housing, and a portion of said wicking means extends into said first electrode.

9. The electrochemical conversion system of claim 1 wherein said ionizable gas is selected from a group consisting of oxygen, hydrogen and sodium.

10. A method of producing electricity, said method comprising the steps of:
    (a) providing an electrochemical cell coupled to a load;
    (b) vaporizing a two phase fluid;
    (c) passing the vaporized two phase fluid past one side of the electrochemical cell so as to create a low partial pressure of ionizable gas upon the one side of the electrochemical cell while passing a stream of ionizable gas adjacent the opposite side of the electrochemical cell to create an ionizable gas partial pressure greater than the ionizable gas partial pressure upon the one side, the ionizable gas partial pressure differential across the cell causing the passage of ionized gas through the electrochemical cell which thereby causes an electric potential difference, and
    (d) entraining the ionizable gas passed through the electrochemical cell into the vaporized two phase fluid.

11. The method of claim 10 further comprising the step of (e) condensing the vaporized two phase fluid, thereby separating the ionizable gas from the two phase fluid.

12. The method of claim 11 wherein the condensed two phase fluid of step (e) is circulated so as to be revaporized in step (b).

13. The method of claim 11 wherein the separated ionizable gas of step (e) is circulated back through the electrochemical cell.

14. The method of claim 12 wherein the separated ionizable gas of step (e) is circulated back through the electrochemical cell.

15. The method of claim 10 wherein the ionizable gas is selected from a group consisting of oxygen, hydrogen and sodium.

16. A method of producing electricity, said method comprising the steps of:
   (a) providing an electrochemical cell;
   (b) circulating a mixture of an ionizable gas and a two phase fluid at a vapor phase past one side of the electrochemical cell and subsequently condensing the two phase fluid of the mixture to a liquid phase adjacent an opposite side of the electrochemical cell, thereby creating a higher ionizable gas partial pressure adjacent the opposite side of the electrochemical cell than the one side of the electrochemical cell; and
   (c) providing a load coupled to the electrochemical cell so as to cause the passage of ionizable gas from the high ionizable gas partial pressure opposite side to the low ionizable gas partial pressure one side, thereby creating an electric potential difference.

17. The method of claim 16 wherein the two phase fluid is continuously circulated between a vapor phase and a fluid phase.

18. The method of claim 16 wherein the ionizable gas is selected from a group consisting of oxygen, hydrogen and sodium.

19. The method of claim 16 wherein the ionizable gas is hydrogen.

* * * * *